US009768623B2

(12) United States Patent
Uchimoto et al.

(10) Patent No.: US 9,768,623 B2
(45) Date of Patent: Sep. 19, 2017

(54) WIRELESS POWER RECEIVER CIRCUIT

(71) Applicant: ROHM CO., LTD., Ukyo-Ku, Kyoto (JP)

(72) Inventors: Daisuke Uchimoto, Kyoto (JP); Naoki Inoue, Kyoto (JP); Tatsuya Iwasaki, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 343 days.

(21) Appl. No.: 14/676,181

(22) Filed: Apr. 1, 2015

(65) Prior Publication Data
US 2015/0207338 A1 Jul. 23, 2015

Related U.S. Application Data

(63) Continuation of application No. PCT/JP2013/005675, filed on Sep. 25, 2013.

(30) Foreign Application Priority Data

Oct. 1, 2012 (JP) .................................. 2012-219500

(51) Int. Cl.
*H01F 27/42* (2006.01)
*H02J 5/00* (2016.01)
(Continued)

(52) U.S. Cl.
CPC .............. *H02J 5/005* (2013.01); *H02J 7/025* (2013.01); *H02J 17/00* (2013.01); *H02J 50/10* (2016.02);
(Continued)

(58) Field of Classification Search
CPC ............. H02J 5/005; H02J 7/025; H02J 17/00
(Continued)

(56) References Cited

U.S. PATENT DOCUMENTS

2011/0285211 A1* 11/2011 Endo ........................ H02J 17/00
307/104
2012/0249055 A1* 10/2012 Wade .................... H02J 7/0019
320/107
(Continued)

FOREIGN PATENT DOCUMENTS

CN 101621219 A 1/2010
CN 102299567 A 12/2011
(Continued)

OTHER PUBLICATIONS

Chinese First Office Action corresponding to Application No. 201380031138.1; Issuing Date: Mar. 31, 2016, with English translation.
(Continued)

*Primary Examiner* — Thomas Skibinski
(74) *Attorney, Agent, or Firm* — Cantor Colburn LLP

(57) ABSTRACT

A wireless power receiver circuit forms a wireless power receiving apparatus together with a reception coil. An internal power supply line is connected to a capacitor C. An output line is connected to a secondary battery. An H-bridge circuit includes N-channel MOSFETs MH1, MH2, ML1, and ML2. A first switch is arranged between a rectification line and the internal power supply line. A second switch is arranged between the rectification line and the output line. A voltage $V_{DD}$ of the internal power supply line is supplied to a power supply terminal of a controller.

16 Claims, 4 Drawing Sheets

(51) Int. Cl.
*H02J 7/02* (2016.01)
*H02J 17/00* (2006.01)
*H02M 1/00* (2006.01)
*H02M 7/219* (2006.01)
*H02J 50/10* (2016.01)

(52) U.S. Cl.
CPC ............... *H02M 2001/0006* (2013.01); *H02M 2007/2195* (2013.01); *Y02B 70/1408* (2013.01)

(58) Field of Classification Search
USPC .................................. 307/104; 320/107–115
See application file for complete search history.

(56) References Cited

U.S. PATENT DOCUMENTS

| | | | |
|---|---|---|---|
| 2013/0140900 A1 | 6/2013 | Yu et al. | |
| 2013/0241304 A1* | 9/2013 | Bae ...................... | H04B 5/0037 307/104 |

FOREIGN PATENT DOCUMENTS

| | | |
|---|---|---|
| JP | 2010051115 A | 3/2010 |
| JP | 2011244684 A | 12/2011 |

OTHER PUBLICATIONS

Tan LinLin et al., "Transfer efficiency optimal control of magnetic resonance coupled system of wireless power transfer based on frequency control" Science China Technological Services, Jun. 2011, vol. 54, No. 6 pp. 1428-1434, with English cover page.

* cited by examiner

WIRELESS POWER RECEIVER CIRCUIT

CROSS REFERENCE TO RELATED APPLICATIONS

This application is a continuation under 35 U.S.C. §120 of PCT/JP2013/005675, filed Sep. 25, 2013, which is incorporated herein by reference and which claimed priority under 35 U.S.C. §119 to Japanese Application No. 2012-219500, filed Oct. 1, 2012, the entire content of which is also incorporated herein by reference.

BACKGROUND OF THE INVENTION

Field of the Invention

The present invention relates to a wireless power supply technique.

Description of the Related Art

In order to charge an electric shaver, an electric toothbrush, a cordless phone, a game machine controller, an electric power tool, or the like, contactless power transmission (which is also referred to as "contactless power supply" or "wireless power supply") is used. FIG. 1 is a diagram showing a configuration of an electronic device including a wireless power receiving apparatus investigated by the present inventors.

An electronic device 1r includes a wireless power receiving apparatus 300, a secondary battery 2, a DC/DC converter 4, and a micro-controller (MCU: Micro-Controller Unit) 6. The wireless power receiving apparatus 300 receives an electric power signal S1 from a wireless power supply apparatus 200, and charges the secondary battery 2. For example, the secondary battery 2 is configured as a nickel hydride battery or a lithium-ion battery. The DC/DC converter 4 steps up or otherwise steps down the voltage $V_{BAT}$ of the secondary battery 2 so as to supply a power supply voltage to the micro-controller 6. The micro-controller 6 controls the overall operation of the electronic device 1r.

The wireless power supply apparatus 200 supplies an electric power signal to the wireless power receiving apparatus 300. The wireless power supply apparatus 200 includes a transmission coil 202 and a driver 204. The driver 204 is configured as a voltage source or otherwise a current source, and applies an AC driving current to the transmission coil 202.

The wireless power receiving apparatus 300 includes a reception coil 302 arranged in the vicinity of the transmission coil 202 such that they are coupled with each other. When the driving current flows through the transmission coil 202, electromagnetic induction occurs, thereby supplying a coil current $I_{COIL}$ that flows through the reception coil 302.

The wireless power receiving apparatus 300 includes a diode bridge circuit 304, an output switch 306, a control switch 308, and resistors R10 through R12 in addition to the reception coil 302. With conventional techniques, the wireless power receiving apparatus 300 is configured as a combination of so-called discrete components.

The diode bridge circuit 304 includes four bridge-connected diodes. The diode bridge circuit 304 rectifies the coil current $I_{COIL}$ that flows through the reception coil 302, so as to generate a charging current $I_{CHG}$. The resistor R10 is connected to the output terminal of the diode bridge circuit 304. The charging current $I_{CHG}$ is supplied to the secondary battery 2 via the output switch 306, thereby charging the secondary battery 2.

The wireless power receiving apparatus 300 receives, as an input signal, a control signal CTRL generated by the micro-controller 6 as an instruction to supply electric power to the secondary battery 2. When the control signal CTRL is asserted (set to high level), the output switch 306 is turned on. In this state, the charging current $I_{CHG}$ is supplied to the secondary battery 2. Examples of such a secondary battery 2 include a nickel hydride battery, a lithium-ion battery, and the like. The output switch 306 is configured as a PNP bipolar transistor. The resistor R12 and the control switch 308 are arranged between the control terminal (base) of the output switch 306 and the ground line. The control switch 308 is configured as an NPN bipolar transistor. The control signal CTRL is input to the base of the control switch 308. Furthermore, the base of the control switch 308 is connected to the output of the diode bridge circuit 304 via the resistor R11.

When the control signal CTRL is set to high level, the control switch 308 is turned on, which supplies the ground voltage to the base of the output switch 306. As a result, the output switch 306 is turned on, which supplies the charging current $I_{CHG}$ to the secondary battery 2. When the control signal CTRL is set to low level, the control switch 308 is turned off, which suspends the charging operation.

The wireless power receiving apparatus 300 according to a conventional technique is configured employing discrete components. As a result, there is a need to employ the diode bridge circuit 304 as a rectifier circuit. This leads to large power loss due to the diodes, resulting in reduced efficiency of the wireless power receiving apparatus 300.

SUMMARY OF THE INVENTION

The present invention has been made in order to solve such a problem. Accordingly, it is an exemplary purpose of an embodiment of the present invention to provide a wireless power receiving apparatus having improved efficiency.

An embodiment of the present invention relates to a wireless power receiver circuit that forms a wireless power receiving apparatus together with a reception coil. The wireless power receiver circuit comprises: an internal power supply line connected to a capacitor; an output line connected to a circuit which is to be supplied with electric power; a rectification line; a ground line; an H-bridge circuit that comprises a first transistor configured as an N-channel MOSFET arranged between the rectification line and one end of the reception coil, a second transistor configured as an N-channel MOSFET arranged between the rectification line and the other end of the reception coil, a third transistor configured as an N-channel MOSFET arranged between the one end of the reception coil and the ground line, and a fourth transistor configured as an N-channel MOSFET arranged between the other end of the reception coil and the ground line; a first switch arranged between the rectification line and the internal power supply line; a second switch arranged between the rectification line and the output line; and a controller that controls the first transistor, the second transistor, the third transistor, and the fourth transistor, which are components of the H-bridge circuit, and the first switch and the second switch. The voltage of the internal power supply line is supplied to a power supply terminal of the controller.

With such an embodiment, an H-bridge circuit employing MOSFETs can be employed as a rectifier circuit that rectifies the coil current that flows through the reception circuit, instead of a diode-bridge circuit. Such an arrangement provides reduced power loss, thereby providing improved efficiency. In order to turn on each upper transistor of the H-bridge circuit, there is a need to apply a voltage that is higher than the voltage of the rectification line to the gate of the transistor. With such an embodiment, by charging the capacitor using the coil current, such an arrangement is capable of generating the voltage that is required to drive the gate. Thus, such an arrangement does not require a so-called bootstrap circuit, thereby suppressing an increase in the number of circuit elements and an increase in the circuit area.

Also, the controller may be configured to be capable of switching between a first state in which the first switch is turned on and the second switch is turned off and a second state in which the first switch is turned off and the second switch is turned on.

In the first state, the capacitor is charged using the coil current, thereby raising the voltage of the internal power supply line to a level that is capable of turning on the upper-side transistors of the H-bridge circuit. Subsequently, the state is switched to the second state, which enables the upper-side transistors of the H-bridge circuit to be switched on and off. Thus, by appropriately switching the state between the first state and the second state, such an arrangement is capable of maintaining the voltage of the internal power supply line such that it is equal to or greater than a level that is capable of turning on the upper-side transistors of the H-bridge circuit, thereby allowing the coil current to be rectified with low power loss.

Also, the controller may switch between the first state and the second state according to a voltage of the internal power supply line.

Also, the wireless power receiver circuit may further comprise a first comparator that compares a first detection voltage that corresponds to the voltage of the internal power supply line with a predetermined first threshold voltage. Also, the controller may switch between the first state and the second state according to an output of the comparator.

Also, the comparator may be configured as a hysteresis comparator. In this case, the first threshold voltage is switched between the upper level and the lower level. Such an arrangement is capable of repeating an operation in which, when the first detection voltage reaches the upper level in the first state, the controller transits to the second state, and when the first detection voltage drops to the lower level in the second state, the controller transits to the first state.

Also, the first detection voltage that corresponds to the voltage of the internal power supply line may be configured as a difference voltage between the voltage of the internal power supply line and the voltage of the output line.

In order to turn on the first transistor and the second transistor in the second state in which the second switch is turned on, there is a need to apply a voltage to the gates of the first and second transistors that is higher than the voltage $V_{OUT}$ of the output line to the extent of the threshold voltage Vth of each MOSFET. In other words, there is a need to set the voltage $V_{DD}$ of the internal power supply line such that the relation $V_{DD} > V_{OUT} + \text{Vth}$ holds true. With such an embodiment, the state can be appropriately switched between the first state and the second state even if the voltage of the output line changes. From another viewpoint, such an embodiment supports various kinds of secondary batteries without changing the settings in the circuit even if the number of cells of the secondary battery is changed.

Also, the controller may switch between the first state and the second state with a predetermined time period. In a case in which the system provides a stable power supply, the rise of the voltage of the internal power supply line after the first state is maintained for a predetermined period, and the drop of the voltage of the internal power supply line after the second state is maintained for a predetermined second period, can be calculated and estimated. Thus, such an arrangement is capable of controlling the state without monitoring the voltage of the internal power supply line.

Also, the controller may be configured to be capable of switching between a first mode in which the gate voltages of the first transistor and the second transistor are each fixed to a low level voltage and the third transistor and the fourth transistor are each switched on and off, and a second mode in which the first transistor, the second transistor, the third transistor, and the fourth transistor are each switched on and off.

Before the voltage of the internal power supply line reaches a voltage level that is capable of turning on the first transistor and the second transistor, even if swinging of the gate voltage of the first transistor and the second transistor is performed, this does not provide switching on and off of these transistors. Such gate voltage swinging leads to only charging and discharging of the gates of these transistors, resulting in wasted charging and discharging current. In order to solve such a problem, when the internal power supply voltage is low, the first mode is selected, thereby reducing wasted current.

Also, the controller may switch between the first mode and the second mode according to a voltage of the internal power supply line.

Also, the wireless power receiver circuit may further comprise a second comparator that compares a second detection voltage that corresponds to the voltage of the internal power supply line with a predetermined second threshold voltage. Also, the controller may switch between the first mode and the second mode according to an output of the second comparator.

Also, the second detection voltage that corresponds to the voltage of the internal power supply line may be configured as a difference voltage between the voltage $V_{DD}$ of the internal power supply line and the voltage $V_{OUT}$ of the output line.

In order to turn on the first transistor and the second transistor in the second state, there is a need to set the voltage $V_{DD}$ of the internal power supply line such that the relation $V_{DD} > V_{OUT} + \text{Vth}$ holds true. With such an embodiment, the mode can be appropriately switched between the first mode and the second mode even if the voltage of the output line changes. From another viewpoint, such an embodiment supports various kinds of secondary batteries without changing the settings in the circuit even if the number of cells of the secondary battery is changed.

Also, the first switch may comprise a fifth transistor configured as a P-channel MOSFET. Also, the back gate of the fifth transistor may be connected such that a cathode of its body diode is connected to the internal power supply line side. Such an arrangement is capable of preventing the charge stored in the capacitor from discharging via the rectification line in the off state of the first switch.

Also, the second switch may comprise a sixth transistor configured as a MOSFET. Also, the back gate of the sixth transistor may be connected such that a cathode of its body diode is connected to the rectification line side.

Also, the second switch may further comprise a seventh transistor configured as a MOSFET arranged in series with the sixth transistor. Also, the back gate of the seventh transistor may be connected such that a cathode of its body diode is connected to the output line side. Such an arrangement is capable of preventing reverse current flow from the battery.

Also, the wireless power receiver circuit may be monolithically integrated on a single semiconductor substrate.

Examples of such a "monolithically integrated" arrangement include: an arrangement in which all the circuit components are formed on a semiconductor substrate; and an arrangement in which principal circuit components are monolithically integrated. Also, a part of the circuit components such as resistors and capacitors may be arranged in the form of components external to such a semiconductor substrate in order to adjust the circuit constants.

By monolithically integrating the driving circuit as a single IC, such an arrangement allows the circuit area to be reduced, and allows the circuit elements to have uniform characteristics.

Another embodiment of the present invention relates to an electronic device. The electronic device may comprise a reception coil and a wireless power receiver circuit.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not substantially affect the electric connection therebetween, or that does not damage the functions or effects of the connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not substantially affect the electric connection therebetween, or that does not damage the functions or effects of the connection therebetween, in addition to a state in which the member A is directly connected to the member C, or the member B is directly connected to the member C.

Figure 2:
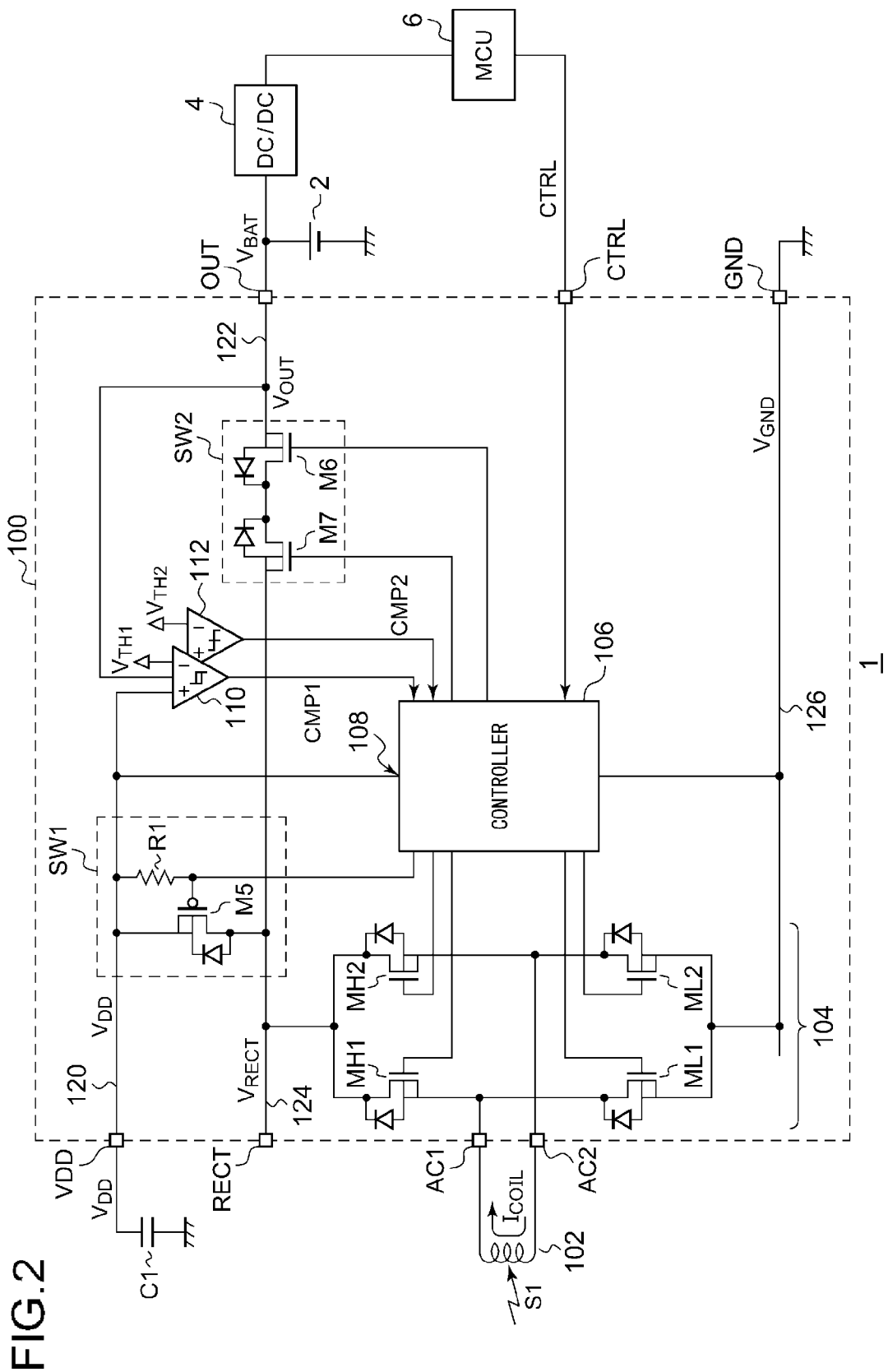
FIG. 2 is a circuit diagram showing a configuration of an electronic device including a wireless power receiving apparatus according to an embodiment.

FIG. 2 is a circuit diagram showing a configuration of an electronic device 1 including a wireless power receiver circuit 100 according to an embodiment. The electronic device includes a reception coil 102, a secondary battery 2, a DC/DC converter 4, and a micro-controller 6, in addition to the wireless power receiver circuit 100.

The electronic device 1 is configured as a device which is capable of receiving electric power from a charger by means of contactless power transmission, examples of which include an electric shaver, an electric toothbrush, a cordless phone, a game machine controller, an electric power tool, and the like.

The wireless power receiver circuit 100 receives an electric power signal S1 from an unshown wireless power supply apparatus, and charges the secondary battery 2. For example, the secondary battery 2 is configured as a nickel hydride battery or a lithium-ion battery. The DC/DC converter 4 steps up or otherwise steps down the battery $V_{BAT}$ of the secondary battery 2, so as to supply a power supply voltage to the micro-controller 6. The micro-controller 6 controls the overall operation of the electronic device 1r.

In the charging operation, the reception coil 102 is located such that it is positioned in the vicinity of a transmission coil of the unshown power supply apparatus such that they are coupled with each other. When the driving current flows through the transmission coil, electromagnetic induction occurs, which supplies an AC coil current $I_{COIL}$ that flows through the reception coil 102.

The wireless power receiver circuit 100 rectifies the coil current $I_{COIL}$, and charges the secondary battery 2. The above is the overall configuration of the electronic device 1. Next, detailed description will be made regarding the wireless power receiver circuit 100.

The wireless power receiver circuit 100 includes, as its input/output terminals, a power supply (VDD) terminal, a rectification (RECT) terminal, an output (OUT) terminal, a control (CTRL) terminal, a ground (GND) terminal, and coil connection (AC1 and AC2) terminals. Preferably, the wireless power receiver circuit 100 is configured as a function IC monolithically integrated on a single semiconductor substrate.

The reception coil 102 is arranged such that its one end is connected to the AC1 terminal and the other end thereof is connected to the AC2 terminal. The wireless power receiver circuit 100 forms a wireless power receiving apparatus together with the reception coil 102. The OUT terminal is connected to a circuit component to be supplied with electric power, i.e., the secondary battery 2. The GND terminal is supplied with the ground electric potential. The VDD terminal is connected to a capacitor C1. The CTRL terminal receives, as an input signal, the control signal CTRL output from the micro-controller 6. During a period in a state in which the secondary battery 2 is to be charged, the micro-controller 6 asserts (e.g., sets to high level) the control signal CTRL. During a period in a state in which the charging operation is to be suspended, the micro-controller 6 negates (e.g., sets to low level) the control signal CTRL.

The wireless power receiver circuit 100 includes an H-bridge circuit 104, a controller 106, a first switch SW1, a second switch SW2, a first comparator 110, a second comparator 112, an internal power supply line 120, an output line 122, a rectification line 124, and a ground line 126.

The internal power supply line 120 is connected to the capacitor C1 via the VDD terminal. The output line 122 is connected to the secondary battery 2 to be supplied with electric power via the OUT terminal. It should be noted that such a circuit to be supplied with electric power is not restricted to a battery. Also, the circuit to be supplied with electric power may be configured as a charger circuit that charges a battery, a DC/DC converter, or a linear regulator. The electric potential of the output line 122 will be referred to as the "output voltage $V_{OUT}$". In a case in which the secondary battery 2 is directly connected to the OUT terminal, the output voltage $V_{OUT}$ is equal to the battery voltage $V_{BAT}$. The rectification line 124 is connected to the RECT terminal. The ground line 126 is grounded via the GND terminal.

The H-bridge circuit 104 includes a first transistor MH1, a second transistor MH2, a third transistor ML1, and a fourth transistor ML2, each configured as an N-channel MOSFET. The first transistor MH1 is arranged between the rectification line 124 and one terminal (AC1) of the reception coil L1. The second transistor MH2 is arranged between the rectification line 124 and the other end (AC2) of the reception coil L1. The third transistor ML1 is arranged between the aforementioned one end (AC1) of the reception coil L1 and the ground line 126. The fourth transistor ML2 is arranged between the other end (AC2) of the reception coil 102 and the ground line 126.

The first switch SW1 is arranged between the rectification line 124 and the internal power supply line 120. The first switch SW1 includes a fifth transistor M5 configured as a P-channel MOSFET. The back gate of the fifth transistor M5 is connected such that the cathode of its body diode is connected to the internal power supply line 120 side. In the present embodiment, the fifth transistor M5 is configured as a P-channel MOSFET. The fifth transistor M5 is arranged such that its source is connected to the internal power supply line 120, and its drain is connected to the rectification line 124. In order to use the first switch SW1 as a normally-off switch, a resistor R1 is arranged between the gate and the source of the fifth transistor M5. When the low level voltage (ground voltage) is applied to the gate of the fifth transistor M5, the fifth transistor M5 is set to a connection state, which turns on the first switch SW1. On the other hand, when the high level voltage ($V_{DD}$) is applied to the gate of the fifth transistor M5, or otherwise the gate of the fifth transistor M5 is set to a high impedance state, the fifth transistor M5 is set to a disconnection state, which turns off the first switch SW1.

The second switch SW2 is arranged between the rectification line 124 and the output line 122. The second switch SW2 includes a sixth transistor M6 configured as a MOSFET. The back gate of the sixth transistor M6 is connected such that the cathode of its body diode is connected to the rectification line 124 side.

Moreover, the second switch SW2 may also include a seventh transistor M7 configured as a MOSFET connected in series with the sixth transistor M6. The back gate of the seventh transistor M7 is connected such that the cathode of its body diode is connected to the output line 122 side.

In a case in which the second switch SW2 comprises the sixth transistor M6 alone, when $V_{OUT}>V_{RECT}$ in the off state of the second switch SW2, there is the potential for reverse current flow to the rectification line 124 from the battery. In order to solve such a problem, the seventh transistor M7 is provided, thereby preventing such reverse current flow.

In the present embodiment, the sixth transistor M6 and the seventh transistor M7 are each configured as an N-channel MOSFET. When the high-level voltage ($V_{DD}$) is applied to the gates of the sixth transistor M6 and the seventh transistor M7, the second switch SW2 is turned on. Conversely, when the low-level voltage (ground voltage $V_{GND}$) is applied to the gates of these transistors, the second switch SW2 is turned off.

Next, description will be made regarding the control operation of the controller 106 for each transistor.

1. Control operation for the first switch SW1 and second switch SW2.

The controller 106 controls the first transistor MH1, the second transistor MH2, the third transistor ML1, and the fourth transistor ML2, which are components of the H-bridge circuit 104, and controls the first switch SW1 and the second switch SW2.

A power supply terminal 108 of the controller 106 is connected to the internal power supply line 120, and receives the supply of a voltage (which will be referred to as the "internal power supply voltage $V_{DD}$") via the internal power supply line 120. The controller 106 is capable of supplying a high-level voltage having the same level as that of the internal power supply voltage $V_{DD}$ to the control terminal (gate) of each transistor. Furthermore, the controller 106 is capable of supplying a low-level voltage having the same level as that of the ground voltage $V_{GND}$ (0 V) to each gate.

The controller 106 is configured to be capable of switching between a first state $\phi 1$ in which the first switch SW1 is turned on and the second switch SW2 is turned off, and a second state $\phi 2$ in which the first switch SW1 is turned off and the second switch SW2 is turned on.

During a period in which the control signal CTRL is negated, the controller 106 is set to the second state $\phi 2$ in order to suspend the supply of current to the secondary battery 2.

During a period in which the control signal CTRL is asserted, the controller 106 switches the state between the first state $\phi 1$ and the second state $\phi 2$ according to the voltage $V_{DD}$ of the internal power supply line 120.

In order to switch the state between the first state $\phi 1$ and the second state $\phi 2$, the first comparator 110 is provided. The first comparator 110 compares a first detection voltage that corresponds to the internal power supply voltage $V_{DD}$ of the internal power supply line 120 with a predetermined first threshold voltage $V_{TH1}$. The controller 106 switches the state between the first state $\phi 1$ and the second state $\phi 2$ according to an output signal (first comparison signal) CMP1 output from the first comparator 110.

Preferably, the first comparator 110 is configured as a hysteresis comparator. The first comparator 110 has a first threshold voltage $V_{TH1}$ that switches between an upper level $V_{TH1H}$ and a lower level $V_{TH1L}$ according to the level of the first comparison signal CMP1, which is the output of the first comparator 110.

With the present embodiment, the first detection voltage is a difference voltage $\Delta V$ between the internal power supply voltage $V_{DD}$ and the voltage (i.e., battery voltage) $V_{BAT}$ of the output line 122, as represented by $\Delta V = V_{DD} - V_{BAT}$. The lower level $V_{TH1L}$ of the first threshold voltage $V_{TH1}$ is set to a value that is equal to or greater than the gate-source threshold voltage Vth of the N-channel MOSFET.

2. Control Operation for the H-Bridge Circuit 104

The controller 106 is configured to be capable of switching the control sequence for the H-bridge circuit 104 between a first mode and a second mode according to the voltage $V_{DD}$ of the internal power supply line 120. Specifically, when the internal power supply voltage $V_{DD}$ is lower than the predetermined second threshold voltage $V_{TH2}$, the mode is set to the first mode. In this mode, the controller 106 switches on and off the third transistor ML1 and the fourth transistor ML2 in a state in which the gate signals supplied to the first transistor MH1 and the second transistor MH2 are not switched on and off, and are fixed to the off state.

Conversely, when the internal power supply voltage $V_{DD}$ is higher than the second threshold voltage $V_{TH2}$, the mode is set to the second mode. In this mode, the first transistor MH1, the second transistor MH2, the third transistor ML1, and the fourth transistor ML2 are each switched on and off.

The second comparator 112 is provided in order to switch the mode between the first mode and the second mode. The second comparator 112 compares a second detection voltage that corresponds to the internal power supply voltage $V_{DD}$ of the internal power supply line 120 with the predetermined second threshold voltage $V_{TH2}$. The controller 106 switches the mode between the first mode and the second mode based on an output signal (second comparison signal) CMP2 output from the second comparator 112.

In addition to the first mode and the second mode, a third mode is provided in which the operation of all the transistors of the H-bridge circuit 104 is suspended so as to operate the H-bridge circuit 104 as a diode bridge circuit. The controller 106 is set to the third mode during a period in which the control signal CTRL received from the micro-controller 6 is negated.

With the present embodiment, the second detection voltage is a difference voltage $\Delta V$ between the internal power supply voltage $V_{DD}$ and the voltage (i.e., battery voltage) $V_{BAT}$ of the output line 122, as represented by $\Delta V = V_{DD} - V_{BAT}$, as with the first detection voltage.

That is to say, (i) when $(V_{DD} - V_{BAT}) < V_{TH2}$, the mode is set to the first mode, and (ii) when $(V_{DD} - V_{BAT}) > V_{TH2}$, the mode is set to the second mode. The second threshold voltage $V_{TH2}$ is set to a value that is equal to or greater than the gate-source threshold voltage Vth of the N-channel MOSFET.

The above is the configuration of the wireless power receiver circuit 100. Next, description will be made regarding the operation thereof.

Figure 3:
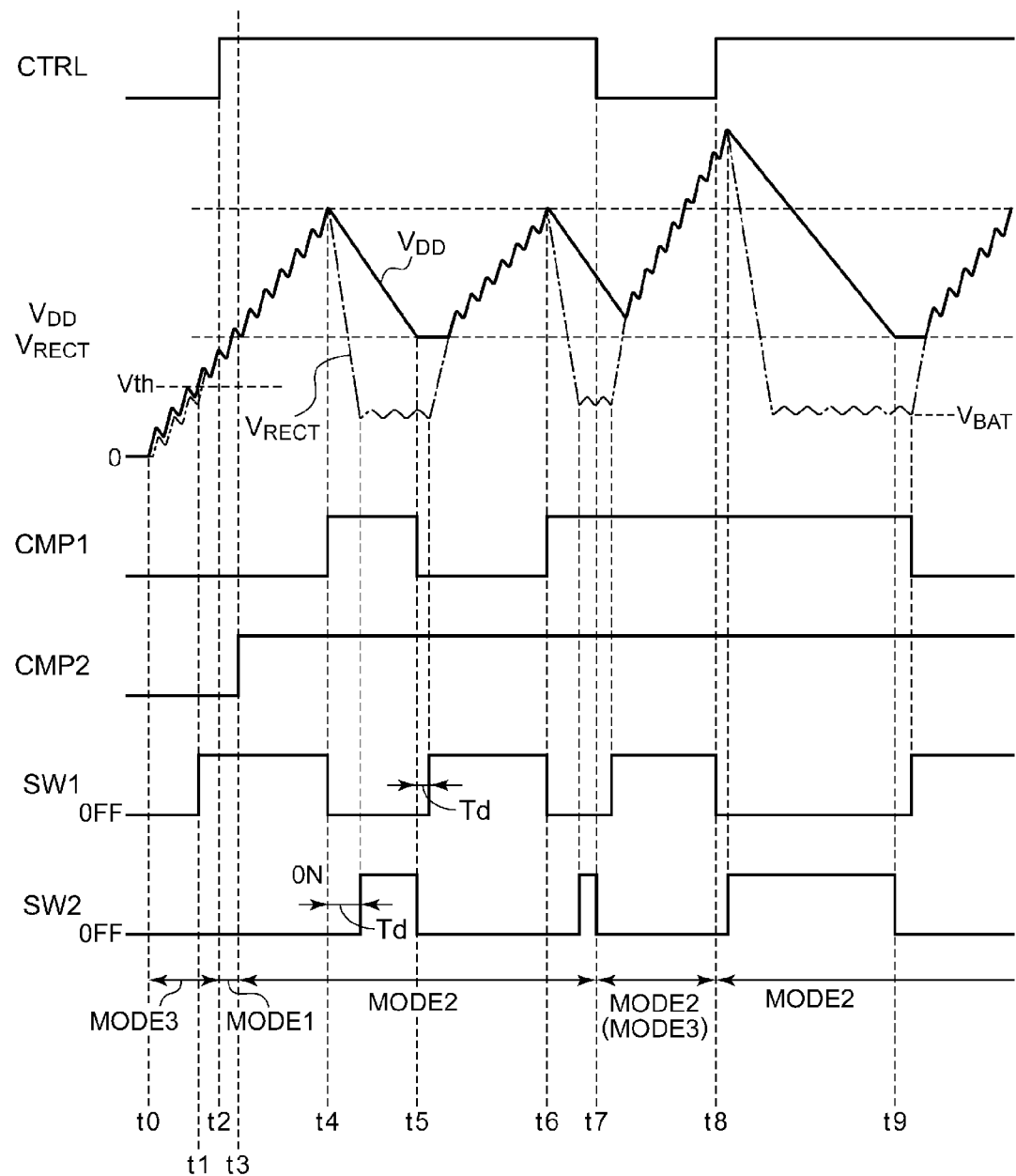
FIG. 3 is an operation waveform diagram showing the operation of the wireless power receiver circuit shown in FIG. 2.

FIG. 3 is an operation waveform diagram showing the operation of the wireless power receiver circuit 100 shown in FIG. 2. FIG. 3 shows, in the following order beginning from the top, the control signal CTRL, the internal power supply voltage $V_{DD}$ and the rectified voltage $V_{RECT}$, the first comparison signal CMP1, the second comparison signal CMP2, the state of the first switch SW1, and the state of the second switch SW2. FIG. 3 shows the states of the first switch SW1 and the second switch SW2 with the high level as the on state, and with the low level as the off state.

Before the time point t0, the wireless power supply circuit 100 is set to the stopped state. In this state, the rectified voltage $V_{RECT}$ and the internal power supply voltage $V_{DD}$ are each reduced to 0 V. At the time point t0, the power supply from the transmission coil is started. In this stage, the internal power supply voltage $V_{DD}$ is reduced to 0 V. Accordingly, each active element included in the wireless power receiver circuit 100 cannot operate. Thus, the first switch SW1 and the second switch SW2 both remain in the off state.

In this stage, the control signal CTRL is negated. Thus, the H-bridge circuit 104 operates as a diode bridge circuit formed of four body diodes (third mode). The coil current $I_{COIL}$ that flows through the reception coil 102 is rectified by the diode-bridge circuit, and the rectified current is supplied to the rectification line 124. Furthermore, the rectified current is supplied to the internal power supply line 120 via the body diode of the fifth transistor M5, thereby charging the capacitor C1. Thus, the internal power supply voltage $V_{DD}$ and the rectified voltage $V_{RECT}$ each rise with time. During this period, the relation $V_{RECT} = V_{DD} + V_F$ holds true. Here, $V_F$ represents the forward voltage of the body diode.

After the time point t0, the ground voltage (0 V) is applied to the gate of the fifth transistor M5. When the electric potential of the source of the fifth transistor M5, i.e., the internal power supply voltage $V_{DD}$, exceeds the gate-source threshold voltage Vth of the P-channel MOSFET, the fifth transistor M5 enters the connection state, which turns on the first switch SW1 (first state φ1). In this state, the relation $V_{RECT} = V_{DD}$ holds true.

Subsequently, the capacitor C1 is charged using the rectified coil current $I_{COIL}$, thereby increasing the voltages $V_{RECT}$ and $V_{DD}$. At the time point t2, the control signal CTRL output from the micro-controller 6 is asserted (set to high level). This instructs the wireless power receiver circuit 100 to start charging.

When the control signal CTRL is asserted, the controller 106 starts the control operation for the first switch SW1, the second switch SW2, and the H-bridge circuit 104. In this stage, the second detection voltage $V_{DD} - V_{BAT}$ is lower than the threshold voltage Vth of the MOSFET. Thus, the second comparison signal CMP2 is set to low level. In this state, the H-bridge circuit 104 is controlled in the first mode.

When the second threshold voltage $(V_{DD} - V_{BAT})$ becomes higher than the threshold voltage Vth at the time point t3, the second comparison signal CMP2 is set to high level. In this state, the controller 106 starts to control the H-bridge circuit 104 in the second mode.

When the first detection voltage $(V_{DD} - V_{BAT})$ reaches the upper level $V_{TH1H}$ of the first threshold voltage $V_{TH1}$, the first comparison signal CMP1 is switched to high level. In this stage, the controller 106 transits to the second state φ2 in which the first switch SW1 is turned off and the second switch SW2 is turned on. It should be noted that the second switch SW2 is preferably turned on with a delay of a dead time Td in order to prevent the first switch SW1 and the second switch SW2 from being on at the same time. Similarly, when the controller 106 transits from the second state φ2 to the first state φ1, the first switch SW1 is preferably turned on with a delay of the dead time Td.

After the second switch SW2 is turned on, the charging current $I_{CHG}$ rectified by the H-bridge circuit 104 is supplied to the secondary battery 2 via the second switch SW2. In this stage, the rectified voltage $V_{RECT}$ becomes approximately the same level as that of the battery voltage $V_{BAT}$.

In order to switch on and off the four transistors of the H-bridge circuit 104, there is a need to charge and discharge the gate capacitance of each transistor. The current used to charge and discharge each transistor is supplied from the capacitor C1. That is to say, after the time point t4, the internal power supply voltage $V_{DD}$ drops with time.

When the first detection voltage $(V_{DD} - V_{BAT})$ becomes lower than the lower level $V_{TH1L}$ of the first threshold voltage $V_{TH1}$, the first comparison signal CMP1 transits to low level. In this stage, the controller 106 returns to the first state φ1 in which the first switch SW1 is turned on and the second switch SW2 is turned off. After the first switch SW1 is turned on, the capacitor C1 is charged using the current rectified by the H-bridge circuit 104. Thus, the internal power supply voltage $V_{DD}$ rises again.

During a period in which the control signal CTRL is asserted, the wireless power receiver circuit 100 alternately switches between the first state φ1 and the second state φ2 (until time point t7).

When the control signal CTRL is negated at the time point t7, the controller 106 is set to the first state φ1. As a result, the capacitor C1 is charged via the first switch SW1, which raises the internal power supply voltage $V_{DD}$ and the rectified voltage $V_{RECT}$. When the control signal CTRL is asserted again at the time point t8, the controller 106 is set to the second state φ2.

It should be noted that, during the period from the time point t7 up to the time point t8 in which the control signal CTRL is negated, the H-bridge circuit 104 may be set to the second mode or otherwise to the third mode.

The above is the operation of the wireless power receiver circuit 100. The wireless power receiver circuit 100 provides the following advantages.

Figure 1:
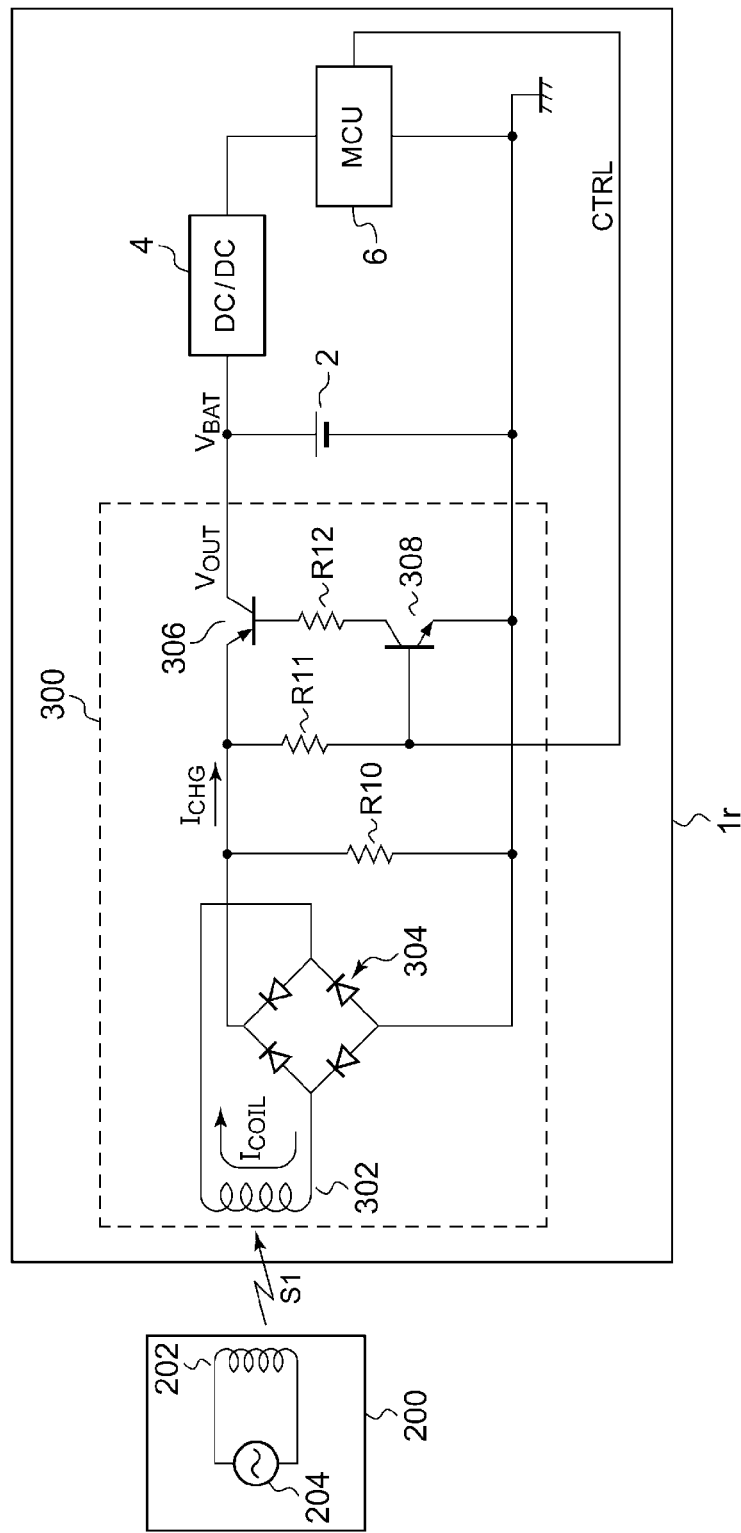
FIG. 1 is a diagram showing a configuration of an electronic device including a wireless power receiving apparatus investigated by the present inventors.

1. With the wireless power receiver circuit 100 shown in FIG. 2, the H-bridge circuit employing MOSFETs can be employed instead of the diode-bridge circuit shown in FIG. 1. Thus, such an arrangement reduces power loss due to a voltage drop that occurs across the diodes, thereby providing improved efficiency.

With such an arrangement, in order to turn on the upper side transistors of the H-bridge circuit 104, i.e., the first transistor MH1 and the second transistor MH2, there is a need to apply, to the gate of each transistor, a voltage that is higher than the source voltage of the transistor, i.e., the voltage of the rectification line $V_{RECT}$. With the wireless power receiving apparatus 100 shown in FIG. 2, the capacitor C1 is charged using the coil current $I_{COIL}$, so as to generate a voltage required to drive the gate of each transistor.

Typically, such an arrangement requires a so-called bootstrap circuit to drive the N-channel MOSFETs. In contrast, the wireless power receiver circuit 100 shown in FIG. 2 does not require such a bootstrap circuit. Thus, such an arrangement suppresses an increase in the number of circuit elements and an increase in the circuit area.

Furthermore, the wireless power receiver circuit 100 alternately repeats the first state φ1 and the second state φ2 during a period in which the control signal CTRL is asserted. In the first state φ1, the capacitor C1 is charged using the coil current, which raises the voltage $V_{DD}$ of the internal power supply line 120 to a level that is capable of turning on the first transistor MH1 and the second transistor MH2 each configured as an upper transistor of the H-bridge circuit 104. After the voltage $V_{DD}$ is raised to such a level, the state is switched to the second state φ2. In this state, the first transistor MH1 and the second transistor MH2 each configured as an upper transistor of the H-bridge circuit 104 can be switched on and off.

In particular, by switching the state between the first state φ1 and the second state φ2 according to the internal power supply voltage $V_{DD}$, such an arrangement is capable of maintaining the internal power supply voltage $V_{DD}$ such that it is equal to or higher than a level that is capable of turning on the first transistor MH1 and the second transistor MH2 of the H-bridge circuit 104. This allows the coil current to be continuously rectified with low power loss.

Furthermore, the first comparator 110 is configured as a hysteresis comparator. This allows the first detection voltage that corresponds to the internal power supply voltage $V_{DD}$ to be maintained at a level equal to or higher than the lower level of the first threshold voltage. That is to say, by setting the lower level to a suitable value, such an arrangement is capable of maintaining the internal power supply voltage $V_{DD}$ at a level equal to or higher than a level that is capable of turning on the first transistor MH1 and the second transistor MH2.

Furthermore, in the wireless power receiver circuit 100 shown in FIG. 2, the first detection voltage that corresponds to the internal power supply voltage $V_{DD}$ is configured as the difference voltage $\Delta V$ between the internal power supply voltage $V_{DD}$ and the voltage $V_{OUT}$ ($V_{BAT}$) of the output line. For the on states of the first transistor MH1 and the second transistor MH2 in the second state φ2, the high level voltage applied to the gates of these transistors, i.e., the internal power supply voltage $V_{DD}$, is required to be equal to or higher than ($V_{OUT}$+Vth). Thus, by setting the first detection voltage to ($V_{DD}$−$V_{OUT}$), such an arrangement is capable of appropriately switching the state between the first state φ1 and the second state φ2. From another viewpoint, such an arrangement is capable of supplying electric power to various kinds of secondary batteries 2 having different battery voltages $V_{BAT}$ without a need to modify the settings in the circuit.

Furthermore, such an arrangement is capable of switching the mode between the first mode and the second mode for controlling the H-bridge circuit 104.

In a condition in which the internal power supply voltage $V_{DD}$ has not reached a level that is capable of turning on the first transistor and the second transistor, even if swinging of the gate voltage of the first transistor MH1 and the gate voltage of the second transistor MH2 is performed, this does not provide switching on and off of these transistors. Such gate voltage swinging leads to only charging and discharging of the gates of these transistors, resulting in wasted charging and discharging current. With the wireless power receiver circuit 100 shown in FIG. 2, by selecting the first mode in a state in which the internal power supply voltage $V_{DD}$ is low, such an arrangement is capable of reducing wasted current.

Furthermore, the second detection voltage is also configured as the difference voltage $\Delta V$ between the internal power supply voltage $V_{DD}$ and the voltage $V_{OUT}$ of the output line 122. This allows the mode to be appropriately switched between the first mode and the second mode even if the voltage of the output line 122 changes. From another viewpoint, such an arrangement supports various kinds of secondary batteries without changing the settings in the circuit even if the number of cells of the secondary battery is changed.

Next, description will be made regarding a specific example of the electronic device 1 employing the wireless power receiver circuit 100.

Figure 4:
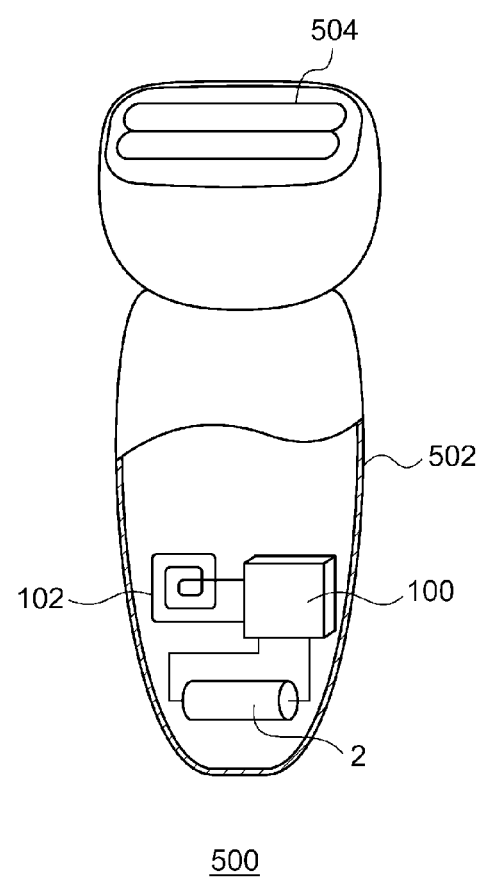
FIG. 4 is a perspective view showing an electronic shaver as an example of an electronic device.

FIG. 4 is a perspective view of an electric shaver 500 as an example of the electronic device 1. The electric shaver 500 includes a casing 502 and a shaver head 504. The casing 502 houses the reception coil 102, the wireless power receiver circuit 100, and the secondary battery 2, together with the DC/DC converter 4 and the micro-controller 6, which are unshown. It should be noted that the layout of such components is not restricted in particular.

Description has been made regarding the present invention with reference to the embodiments. The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

[Modification 1]

The first detection voltage to be compared with the threshold voltage $V_{TH1}$ by the first comparator 110 may be configured as the internal power supply voltage $V_{DD}$ itself.

In this case, the battery voltage $V_{BAT}$ is determined in the specifications according to the set (electronic device) on which the wireless power receiver circuit 100 is mounted. Thus, by determining the threshold voltage $V_{TH1}$ (the lower level in a case of employing a hysteresis comparator) based on the specification value of the battery voltage $V_{BAT}$ such that the relation ($V_{TH1}$>$V_{BAT}$+Vth) holds true, such an arrangement provides the same control operation as that provided by the embodiment. Also, the threshold voltage $V_{TH1}$ may be configured as a variable value that is changed according to the battery voltage $V_{BAT}$.

[Second Modification]

The second detection voltage to be compared with the threshold voltage $V_{TH2}$ by the second comparator 112 may be configured as the internal power supply voltage $V_{DD}$ itself. In this case, by determining the second threshold voltage $V_{TH2}$ such that the relation ($V_{TH2}$>$V_{BAT}$+Vth) holds true, such an arrangement provides the same control operation as that provided by the embodiment. Also, the threshold voltage $V_{TH2}$ may be configured as a variable value that is changed according to the battery voltage $V_{BAT}$.

[Modification 3]

Description has been made in the embodiment regarding an arrangement in which the state is switched between the first state φ1 and the second state φ2 according to the internal power supply voltage $V_{DD}$. However, the present invention is not restricted to such an arrangement. For example, the controller 106 may switch the state between the first state φ1 and the second state φ2 with a predetermined time period during a period in which the control signal CTRL is asserted.

In a case in which the system provides a stable power supply, the rise of the internal power supply voltage $V_{DD}$ after the first state φ1 is maintained for a predetermined first period, and the drop of the internal power supply voltage $V_{DD}$ after the second state φ2 is maintained for a predetermined second period, can each be calculated and estimated with high precision. Thus, such an arrangement is capable of controlling the state without monitoring the internal power supply voltage $V_{DD}$. In this case, a timer circuit may preferably be employed instead of the first comparator 110.

Also, such an arrangement may employ a combination of the state control operation using the comparator and the state control operation using the timer. For example, an arrangement may be made in which, when the first detection voltage drops to the first threshold voltage $V_{TH1}$ in the second state φ2, the state is switched to the first state φ1, and the state is switched to the state φ2 again after a predetermined time period elapses after the state is switched to the first state φ1. Such an arrangement is also capable of maintaining the internal power supply voltage $V_{DD}$ at a level that is capable of turning on the first transistor.

While the preferred embodiments of the present invention have been described using specific terms, such description is for illustrative purposes only, and it is to be understood that changes and variations may be made without departing from the spirit or scope of the appended claims.

What is claimed is:

1. A wireless power receiver circuit that forms a wireless power receiving apparatus together with a reception coil, the wireless power receiver circuit comprising:
   an internal power supply line connected to a capacitor;
   an output line;
   a rectification line;
   a ground line;
   an H-bridge circuit that comprises a first transistor configured as an N-channel MOSFET arranged between the rectification line and one end of the reception coil, a second transistor configured as an N-channel MOSFET arranged between the rectification line and another end of the reception coil, a third transistor configured as an N-channel MOSFET arranged between the one end of the reception coil and the ground line, and a fourth transistor configured as an N-channel MOSFET arranged between the other end of the reception coil and the ground line;
   a first switch arranged between the rectification line and the internal power supply line;
   a second switch arranged between the rectification line and the output line; and
   a controller that controls the first transistor, the second transistor, the third transistor, and the fourth transistor, which are components of the H-bridge circuit, and the first switch and the second switch,
   wherein a voltage of the internal power supply line is supplied to a power supply terminal of the controller.

2. The wireless power receiver circuit according to claim 1, wherein the controller is structured to be capable of switching between a first state in which the first switch is turned on and the second switch is turned off and a second state in which the first switch is turned off and the second switch is turned on.

3. The wireless power receiver circuit according to claim 2, wherein the controller switches between the first state and the second state according to a voltage of the internal power supply line.

4. The wireless power receiver circuit according to claim 3, further comprising a comparator that compares a first detection voltage that corresponds to the voltage of the internal power supply line with a predetermined first threshold voltage,
   and wherein the controller switches between the first state and the second state according to an output of the comparator.

5. The wireless power receiver circuit according to claim 4, wherein the comparator is configured as a hysteresis comparator.

6. The wireless power receiver circuit according to claim 4, wherein the first detection voltage that corresponds to the voltage of the internal power supply line is a difference voltage between the voltage of the internal power supply line and the voltage of the output line.

7. The wireless power receiver circuit according to claim 2, wherein the controller switches between the first state and the second state with a predetermined time period.

8. The wireless power receiver circuit according to claim 1, wherein the controller is configured to be capable of switching between a first mode in which the gate voltages of the first transistor and the second transistor are each fixed to a low level voltage and the third transistor and the fourth transistor are each switched on and off, and a second mode in which the first transistor, the second transistor, the third transistor, and the fourth transistor are each switched on and off.

9. The wireless power receiver circuit according to claim 8, wherein the controller switches between the first mode and the second mode according to a voltage of the internal power supply line.

10. The wireless power receiver circuit according to claim 9, further comprising a second comparator that compares a second detection voltage that corresponds to the voltage of the internal power supply line with a predetermined second threshold voltage, and wherein the controller switches between the first mode and the second mode according to an output of the second comparator.

11. The wireless power receiver circuit according to claim 10, wherein the second detection voltage that corresponds to the voltage of the internal power supply line is a difference voltage between the voltage of the internal power supply line and the voltage of the output line.

12. The wireless power receiver circuit according to claim 1, wherein the first switch comprises a fifth transistor configured as a MOSFET, and wherein a back gate of the fifth transistor is connected such that a cathode of its body diode is connected to the internal power supply line side.

13. The wireless power receiver circuit according to claim 1, wherein the second switch comprises a sixth transistor configured as a MOSFET, and wherein a back gate of the sixth transistor is connected such that a cathode of its body diode is connected to the rectification line side.

14. The wireless power receiver circuit according to claim 13, wherein the second switch further comprises a seventh transistor configured as a MOSFET arranged in series with the sixth transistor, and wherein a back gate of the seventh transistor is connected such that a cathode of its body diode is connected to the output line side.

15. The wireless power receiver circuit according to claim 1, which is monolithically integrated on a single semiconductor substrate.

16. An electronic device comprising:
a reception coil; and
the wireless power receiver circuit according to claim 1.

* * * * *